UNITED STATES PATENT OFFICE.

GUSTAVE DOSSELMAN AND PERCY NEYMANN, OF CHICAGO, ILLINOIS, ASSIGNORS, BY MESNE ASSIGNMENTS, TO CHADELOID CHEMICAL COMPANY, OF NEW YORK, N. Y., A CORPORATION OF WEST VIRGINIA.

COMPOSITION FOR REMOVING SURFACE-FINISHES.

1,014,211.  Specification of Letters Patent.  Patented Jan. 9, 1912.

No Drawing.  Application filed June 24, 1903. Serial No. 162,885.

*To all whom it may concern:*

Be it known that we, GUSTAVE DOSSELMAN and PERCY NEYMANN, citizens of the United States, residing at Chicago, county of Cook, State of Illinois, have invented a certain new and useful Improvement in Compositions for Removing Surface-Finishes, and declare the following to be a full, clear, and exact description of the same, such as will enable others skilled in the art to which it pertains to make and use the same.

Our invention relates generally to the removal from a surface of a previously applied finish, such for instance as varnish, paint, enamel, shellac, gums, and lacquers, thereby restoring the treated surface to the condition thereof prior to the application of the finish.

The usual method of removing varnish or other finish from surfaces, such for instance as woodwork, preparatory to refinishing them involves the slow and tedious process of scraping the finish from the surface by means of a sharp edge or by burning.

The primary object of our invention is to provide means for readily and thoroughly removing varnish or other finish from surfaces which will obviate the labor incident to scraping or burning.

A further object of our invention is to provide a composition of matter which when applied to a finished surface will dissolve the finish so that it may be removed from the surface coincidently with the removal of the composition.

Our invention, generally described, is a composition of matter consisting in a liquid which will dissolve varnish or other finish upon a surface and a substance which will prevent the too rapid drying of the liquid after it has dissolved the finish so that the dissolved finish will be removed simultaneously with the removal of the composition.

In preparing our composition of matter for removing varnish and other finish from surfaces we preferably use paraffin, benzol and acetone combined in proportions suitable to accomplish the desired result. In practice we have found that a composition consisting in 45 pounds of paraffin, 135 gallons of benzol, and 137 gallons of acetone produces excellent results and merely requires an application of such compound to the surface from which the finish is to be removed and the subsequent removal of the composition from the surface which coincidently removes the finish which has been dissolved, thereby leaving the surface entirely free from the finish and in the same condition in which it was prior to the application thereto of the finish. The benzol and acetone attack the varnish or other finish and dissolve the same, while the paraffin prevents the benzol and acetone from drying before the composition may be removed from the surface.

While paraffin is the preferable ingredient which is used to prevent the too rapid drying of the composition, other forms of wax or waxy material may be used either a mineral wax such as the hydrocarbons akin to paraffin, vegetable wax, such as carnauba or animal waxy material, such as beeswax, or fatty acids. Instead of benzol, alcohol may be used in the composition or other solvents of a generally benzolic character such as other similar coal tar products or a petroleum product such as benzine may be employed.

Our improved composition may be made in liquid form by the following process; the benzol or equivalent is placed in the receptacle or mixing tank to which is added the paraffin or its equivalent either in a melted condition or in the form of small particles, after which the acetone is added. Our composition may also be made in the form of a semi-paste in which case in addition to the ingredients contained by the liquid form ceresin wax is added, the proportions of the ingredients which in practice have been found to produce good results being 40 pounds of paraffin, 40 pounds of ceresin wax, 140 gallons of benzol, and 140 gallons of acetone.

In compounding the composition to form the semi-paste the paraffin and ceresin wax may first be melted together and added to the benzol and acetone, or the waxes may be dissolved in the benzol.

By means of a composition of matter composed of the ingredients or their equivalents above described we are enabled to produce a varnish remover which is adapted to free surfaces not only from varnish but from all forms of finish merely by the application of the composition to the surface and the subsequent removal of the composition which restores the surface to its condition prior to the application thereto of the finish.

Having now fully described our invention what we claim as new, and desire to secure by Letters Patent, is—

1. A composition of matter for removing finish from surfaces comprising waxy material, a wax solvent for said waxy material and acetone.

2. A composition of matter for removing finish from surfaces comprising paraffin and ceresin wax, a wax solvent and acetone.

3. A composition of matter for removing finish from surfaces comprising waxy material, benzol and acetone.

4. A composition of matter for removing finish from surfaces comprising paraffin, ceresin wax, benzol and acetone.

5. A composition of matter for removing finish from surfaces comprising acetone and other solvents for dissolving the finish, and wax for preventing the too rapid drying of the composition.

6. A composition of matter for removing finish from surfaces and approximately comprising forty pounds of paraffin, forty pounds of ceresin wax, one-hundred and forty gallons of benzol and one-hundred and forty gallons of acetone.

7. A composition of matter for removing finish from surfaces, comprising about equal proportions of benzol and acetone and about three and a half per cent. of waxy material.

8. A composition of matter for removing finish from surfaces comprising about equal parts of acetone and other neutral volatile solvent material combined with not more than about three and a half per cent. of waxy material.

9. The substantially fluent finish remover consisting largely of organic finish softening material comprising acetone and incorporated evaporation retarding material comprising paraffin.

In testimony whereof, we sign this specification in the presence of two witnesses.

GUSTAVE DOSSELMAN.
PERCY NEYMANN.

Witnesses:
H. S. GAITHER,
C. C. CUNNINGHAM.